(12) United States Patent
Kinnaird

(10) Patent No.: US 11,668,220 B2
(45) Date of Patent: Jun. 6, 2023

(54) FLASH BOILING INJECTION CONTROL

(71) Applicant: Faurecia Emissions Control Technologies, USA, LLC, Columbus, MI (US)

(72) Inventor: Edward Kinnaird, Columbus, IN (US)

(73) Assignee: Faurecia Emissions Control Technologies, USA, LLC, Columbus, IN (US)

(*) Notice: Subject to any disclaimer, the term of this patent is extended or adjusted under 35 U.S.C. 154(b) by 0 days.

(21) Appl. No.: 17/386,744

(22) Filed: Jul. 28, 2021

(65) Prior Publication Data

US 2023/0033617 A1 Feb. 2, 2023

(51) Int. Cl.
F01N 3/20 (2006.01)

(52) U.S. Cl.
CPC ............ F01N 3/208 (2013.01); *F01N 2570/14* (2013.01); *F01N 2610/02* (2013.01); *F01N 2610/10* (2013.01); *F01N 2610/146* (2013.01); *F01N 2610/148* (2013.01); *F01N 2900/0412* (2013.01); *F01N 2900/1808* (2013.01)

(58) Field of Classification Search
CPC ... F01N 3/208; F01N 2570/14; F01N 2610/02; F01N 2610/10; F01N 2610/146; F01N 2610/148; F01N 2900/0412; F01N 2900/1808
See application file for complete search history.

(56) References Cited

U.S. PATENT DOCUMENTS

| | | | |
|---|---|---|---|
| 10,920,641 B2 | 2/2021 | Kinnaird et al. | |
| 2005/0069468 A1* | 3/2005 | Huber et al. | F01N 3/2066 422/172 |
| 2009/0038299 A1* | 2/2009 | Gierszewski et al. | F01N 11/00 60/301 |
| 2012/0177553 A1* | 7/2012 | Lindemann et al. | F23J 7/00 423/239.1 |
| 2015/0113957 A1* | 4/2015 | Bauer | F01N 11/00 60/274 |
| 2022/0106895 A1* | 4/2022 | Diouf et al. | F01N 3/208 |

FOREIGN PATENT DOCUMENTS

| | | |
|---|---|---|
| CN | 111622828 A | 9/2020 |
| CN | 111693562 A | 9/2020 |
| WO | 2020161114 A1 | 8/2020 |

* cited by examiner

*Primary Examiner* — Brandon D Lee
(74) *Attorney, Agent, or Firm* — Carlson, Gaskey & Olds, P.C.

(57) ABSTRACT

An exemplary vehicle exhaust system includes, among other things, a housing defining a fluid chamber and at least one pressure sensor positioned within the fluid chamber. The housing has a fluid inlet configured to receive fluid from a fluid supply and a fluid outlet. A heater heats fluid supplied from the fluid supply such that heated fluid can be injected into a vehicle exhaust component via the fluid outlet. A controller is configured to receive pressure data from the at least one pressure sensor and to determine optimal timing for dosing of the vehicle exhaust component based on the pressure data.

17 Claims, 2 Drawing Sheets

FLASH BOILING INJECTION CONTROL

BACKGROUND

An exhaust system includes catalyst components to reduce emissions. The exhaust system includes an injection system that injects a diesel exhaust fluid (DEF), or a reducing agent such as a solution of urea and water for example, upstream of a selective catalytic reduction (SCR) catalyst which is used to reduce Nitrous Oxides (NOx) emissions. The injection system includes a doser that sprays the fluid into the exhaust stream via an injection valve to mix with the exhaust stream so that a chemical reaction between the reducing agent and exhaust gases reduces NOx in the exhaust gas

SUMMARY

In one exemplary embodiment, a vehicle exhausts system includes, among other things, a housing defining a fluid chamber and at least one pressure sensor positioned within the fluid chamber. The housing has a fluid inlet configured to receive fluid from a fluid supply and a fluid outlet. A heater heats fluid supplied from the fluid supply such that heated fluid can be injected into a vehicle exhaust component via the fluid outlet. A controller is configured to receive pressure data from the at least one pressure sensor and to determine optimal timing for dosing of the vehicle exhaust component based on the pressure data.

In a further embodiment of the above, the housing includes at least one bore extending through a wall of the housing, and wherein the at least one pressure sensor is associated with the at least one bore to connect to the controller which is positioned external to the housing.

In a further embodiment of any of the above, a sealed interface is at the at least one bore to prevent fluid from exiting the housing via the at least one bore.

In a further embodiment of any of the above, wherein the controller determines the optimal timing and generates a dosing command when pressure measured within the fluid chamber is within a range that has a minimum pressure and a maximum pressure, and optionally the range can be of 7-bars as the minimum pressure to 11-bars as the maximum pressure.

In a further embodiment of any of the above, the controller prevents dosing when pressure measured within the fluid chamber is below the minimum pressure.

In a further embodiment of any of the above, the controller only uses the pressure data to determine the optimal timing for dosing of DEF.

In a further embodiment of any of the above, the fluid comprises DEF, and wherein fluid exiting the fluid outlet during the optimal timing as determined by the controller is comprised of vapor and droplets having a size range of a minimum size greater than zero to a maximum size of 15 µm.

In a further embodiment of any of the above, the heater directly heats an internal or external surface of the housing.

In a further embodiment of any of the above, the heater comprises a resistive heater, heat recovery, heat exchanger, or thermo chemical energy storage.

In a further embodiment of any of the above, the controller compares measured pressure inside the fluid chamber to a look-up table based on experimental test data to determine the optimal timing for dosing the vehicle exhaust component via the fluid outlet.

In a further embodiment of any of the above, the fluid chamber is free from any other sensors.

In another exemplary embodiment, a vehicle exhaust system includes among other things, a fluid supply of DEF, a vehicle exhaust component positioned upstream of an exhaust gas aftertreatment component, wherein the vehicle exhaust component defines an exhaust gas stream into which DEF is to be injected, and a housing defining a fluid chamber, wherein the housing has a fluid inlet that receives DEF from the fluid supply and a fluid outlet in communication with the exhaust gas stream within the vehicle exhaust component. At least one pressure sensor is positioned within the fluid chamber. A heater heats DEF supplied from the fluid supply such that heated DEF can be dosed into the exhaust gas stream via the fluid outlet. A controller is configured to receive pressure data from the at least one pressure sensor and to determine optimal timing for dosing based on the pressure data.

In a further embodiment of any of the above, wherein the controller determines the optimal timing and generates a dosing command when pressure measured within the fluid chamber is within a range that has a minimum pressure and a maximum pressure, and optionally the range can be of 7-bars as the minimum pressure to 11-bars as the maximum pressure.

In a further embodiment of any of the above, the controller only uses the pressure data to determine the optimal timing for dosing of DEF.

In a further embodiment of any of the above, DEF exiting the fluid outlet during the optimal timing as determined by the controller is comprised of vapor and droplets having a size range of a minimum size greater than zero to a maximum size of 15 µm.

In a further embodiment of any of the above, the controller compares measured pressure inside the fluid chamber to a look-up table based on experimental test data to determine the optimal timing for dosing of fluid into the vehicle exhaust component via the fluid outlet.

In a further embodiment of any of the above, the fluid chamber is free from any other sensors.

An exemplary method of controlling injection of fluid into a vehicle exhaust system component includes, among other things: providing a housing defining a fluid chamber, the housing having a fluid inlet configured to receive fluid from a fluid supply and a fluid outlet; positioning at least one pressure sensor within the fluid chamber; providing a heater to heat fluid supplied from the fluid supply such that heated fluid can be injected into a vehicle exhaust component via the fluid outlet; and determining optimal timing for dosing the vehicle exhaust component based on pressure data generated by the at least one pressure sensor.

In a further embodiment of any of the above, the method includes determining the optimal timing and generating a dosing command when pressure measured within the fluid chamber is within a range that has a minimum pressure and a maximum pressure, and optionally the range can be of 7-bars as the minimum pressure to 11-bars as the maximum pressure, and wherein fluid exiting the fluid outlet during the optimal timing is comprised of vapor and droplets having a size range of a minimum size greater than zero to a maximum size of 15 µm.

In a further embodiment of any of the above, a controller only uses the pressure data to determine the optimal timing for injection of the fluid, and wherein the fluid chamber is free from any other sensors.

These and other features of this application will be best understood from the following specification and drawings, the following of which is a brief description.

DETAILED DESCRIPTION

Figure 1:
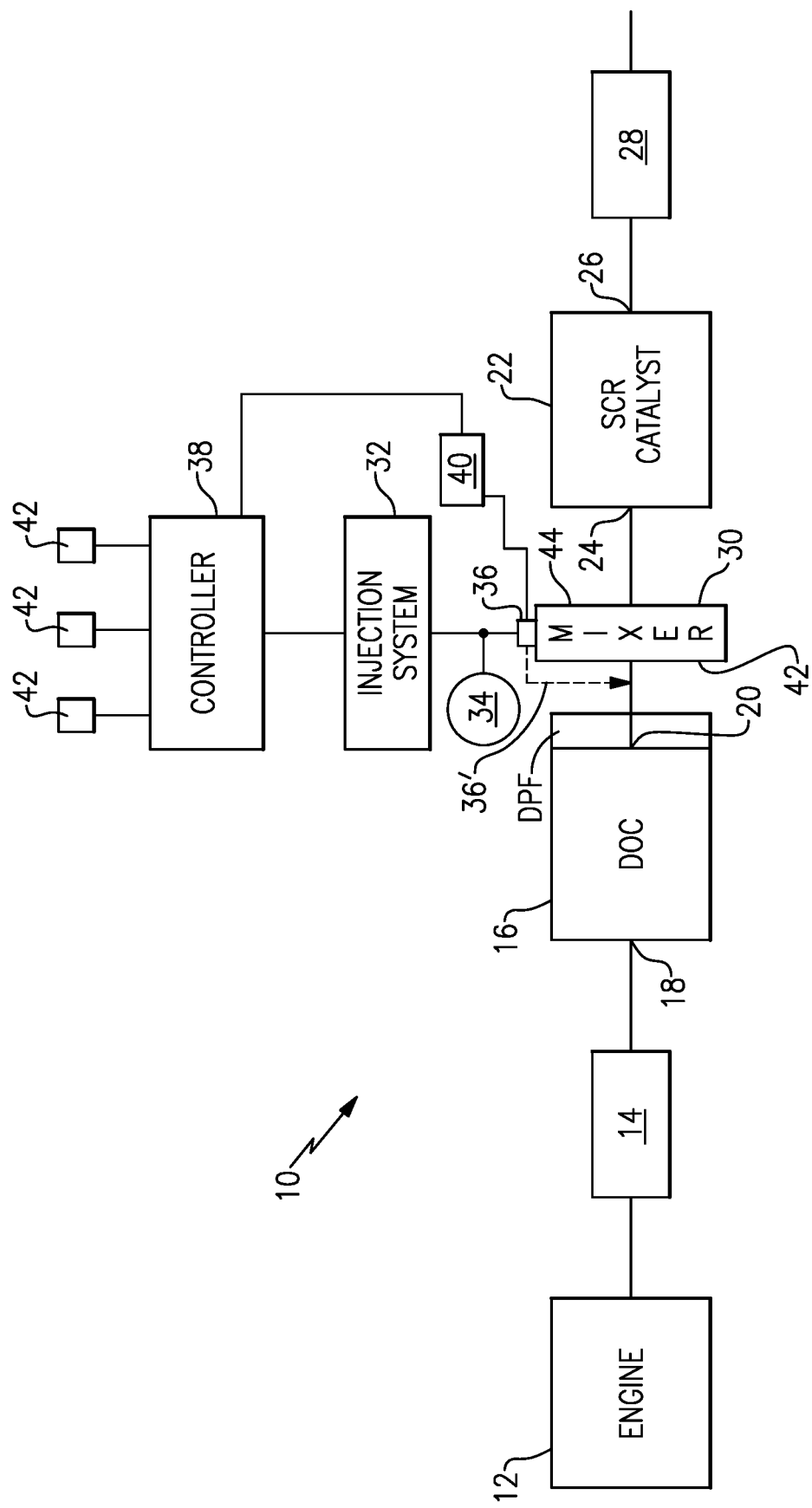
FIG. 1 schematically illustrates one example of an exhaust system with an injection system according to the subject disclosure.

FIG. 1 shows a vehicle exhaust system 10 that conducts hot exhaust gases generated by an engine 12 through various upstream exhaust components 14 to reduce emission and control noise as known. In one example configuration, the upstream exhaust component 14 comprises at least one pipe that directs engine exhaust gases into one or more exhaust gas aftertreatment components. In one example, the exhaust gas aftertreatment components include a diesel oxidation catalyst (DOC) 16 having an inlet 18 and an outlet 20, and an optional diesel particulate filter (DPF) that is used to remove contaminants from the exhaust gas as known. Downstream of the DOC 16 and optional DPF is a selective catalytic reduction (SCR) catalyst 22 having an inlet 24 and an outlet 26. The outlet 26 communicates exhaust gases to downstream exhaust components 28 including a tailpipe. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

In one example, a mixer 30 is positioned downstream from the outlet 20 of the DOC 16 or DPF and upstream of the inlet 24 of the SCR catalyst 22. The upstream catalyst and downstream catalyst can be in-line or in parallel, for example. The mixer 30 is used to facilitate mixing of the exhaust gas.

An injection system 32 is used to inject a reducing agent, such as diesel exhaust fluid (DEF), for example, into the exhaust gas stream upstream from the SCR catalyst 22 such that the mixer 30 can mix the DEF and exhaust gas thoroughly together. The injection system 32 includes a fluid supply tank 34, a doser 36, and a controller 38 that controls injection of the fluid as known. In one example, the doser 36 injects the DEF into the mixer 30 as shown in FIG. 1. In other examples, the doser 36 can inject the DEF into the exhaust system at other locations such as upstream of the mixer 30 as schematically indicated at 36'. Additionally, the SCR catalyst 22 could be downstream of component 14 and upstream of DOC 16 as an alternative, and the doser 36 and mixer 30 would be positioned to stay upstream of the SCR catalyst 22.

Providing ultra-low NOx emissions requires dosing at low temperatures to address de-nox at cold start and low load cycles. Dosing DEF at low temperatures raises thermolysis and deposit issues as there is usually insufficient heat from the exhaust gas to manage deposits. To address these issues, the injection system 32 heats the DEF prior to entering the mixer 30, or prior to entering the SCR catalyst 22 if there is no mixer, which provides for faster atomization and better mixing.

A heater 40 can be selectively used to heat the DEF prior to mixing with exhaust gas. The heater 40 is shown schematically in FIG. 2. The heated DEF can be in the form of a liquid, gas, or a mixture of both. In one example, the heater 40 is mounted to an external surface of the housing 52. In this example, the heater 40 directly heats the external surface of the housing 52 which then conducts the heat internally to heat the DEF within the fluid chamber 54. The heater can also be located internally or integrated into the housing.

In one example, the heater 40 comprises a resistive heater that heats up as electricity flows through the heater. A resistive heater includes resistive heating elements that generate heat as an electrical current passes through the elements. Resistive heating elements can be composed of metallic alloys, ceramic materials, or ceramic metals, for example. Optionally, heat recovery, heat exchanger, or thermo chemical energy storage device could also be used A control system includes the controller 38 that controls heating of the DEF and based on one or more of exhaust gas temperature, exhaust flow, backpressure, time, and wear. Additionally, there are a plurality of system sensors 42 that can be used to determine temperatures throughout the system, flow rates, rate of deposit formation, and wear, for example. The sensors 42 communicate data to the controller 38 such that the controller can determine when to generate a control signal, which is communicated to the injection system 32 to control when DEF is to be heated. Typically, DEF is to be heated during cold starts and/or cold operating cycles where exhaust gas temperatures are less than 250° C.

In one example, the controller 38 controls timing for injection/dosing of the DEF based on data from at least one pressure sensor 66. The pressure sensor 66 communicates data to the controller 38 such that the controller 38 can determine, via an algorithm, when to generate an injection or dosing signal, which is communicated to the injection system 32 to initiate dosing. Thus, the controller 38 determines when to start the dosing as well as the duration of the dosing.

The controller 38 can be a dedicated electronic control unit or can be an electronic control unit associated with a vehicle system control unit or sub-system control unit. The controller 38 can include a processor, memory, and one or more input and/or output (I/O) device interface(s) that are communicatively coupled via a local interface. The controller 38 may be a hardware device for executing software, particularly software stored in memory. The controller 38 can be a custom made or commercially available processor, or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs and/or algorithms, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The controller 38 can be configured to execute software stored within the memory, to communicate data to and from the memory, and to generally control operations of the computing device pursuant to the software.

Figure 2:
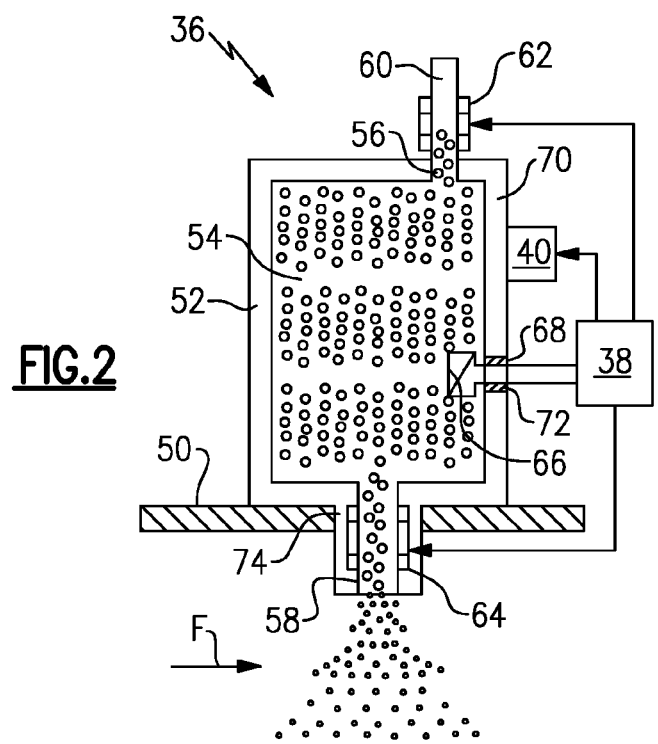
FIG. 2 is a schematic cross-sectional side view of a flash-boil chamber for a doser within the injection system of FIG. 1.

FIG. 2 schematically shows an exhaust component 50, such as a pipe for example, which defines an exhaust gas flow path F that receives a stream of exhaust gases from the engine 12. The exhaust component 50 could also be a housing for an after-treatment element or a mixer, for example. As discussed above, the injection system 32 is configured to inject heated DEF into the exhaust gas flow path F upstream from an exhaust gas aftertreatment component. The doser 36 of the injection system 32 comprises a flash-boil doser that includes a doser body in which DEF is conditioned before being injected into the exhaust stream. The flash-boil doser 36 is mounted to the component 50 and is configured to inject the DEF through an injection aperture 74 formed in the component. The doser body includes a housing 52 defining a fluid/flash-boil chamber 54 that receives DEF. The housing 52 has a fluid inlet 56 and a fluid outlet 58. The fluid inlet 56 is configured to receive DEF from the fluid supply via a supply line 60.

An inlet valve 62 is positioned at the fluid inlet 56 and is controlled by the controller 38 to allow DEF to flow into the fluid chamber 54 when predetermined conditions are met. The fluid outlet 58 includes an outlet valve 64 that is controlled by the controller 38 to allow DEF to flow into the exhaust gas stream of the exhaust component 50 when predetermined conditions are met. Additionally, the housing 52 is in association with the heater 40 such that, when needed, the DEF can be heated to a desired temperature before the heated DEF is introduced into the exhaust component 50 via the outlet valve 64. The controller 38 controls flow through the valves 62, 64 to achieve the desired temperature levels and to control the time and length of injection of fluid into the exhaust component 50. Any suitable types of valves 58, 60 can be used to control the fluid flow through the inlet 56 and outlet 58.

Fluid in the flash-boil chamber 54 is heated by the heater 40, which increases a pressure within the flash-boil chamber 54. The inlet 56 to the housing 52 defines an inlet passageway that opens into the flash-boil chamber 54 to admit DEF from the supply tank 34. The outlet 58 from the housing 52 defines an outlet passageway that opens from the flash-boil chamber 54 into the exhaust passageway of the exhaust component 50, e.g. a mixer.

At least one pressure sensor 66 is positioned within the fluid chamber 54 to directly measure pressure within the heated fluid chamber 54. The controller 38 is configured to receive pressure data from the pressure sensor 66 and to determine optimal timing to inject DEF into the vehicle exhaust component 50 based on the pressure data. In one example, the housing 52 includes at least one bore 68 extending through a wall 70 of the housing 52. The pressure sensor 66 is associated with the bore 68 to connect to the controller 38 which is positioned external to the housing 52. A sealed interface 72 is provided at the bore 68 to prevent fluid from exiting the housing 52 via the at least one bore 68.

In one example, the fluid chamber 54 is free from having any other sensors. In other words, there are no flow-rate sensors, temperature sensors, etc. located within the fluid chamber 54. This reduces the number of sealed interfaces in the housing 52, which also reduces cost.

It is important to identify the optimal injection time of the two phase vapor/liquid, which can determine the required droplet size depending on an engine operating point. Examples of engine operating points include Federal Test Procedure (FTP), Low Load Cycle (LLC), Real Driving Emissions (RDE), etc. In one type of flash boiling doser, DEF is injected dependent on a nominal DEF temperature range of 140° C. to 160° C., where flash boiling occurs. Thus, the DEF is heated by the heater 40 until the desired temperature level of 140° C. to 160° C. is reached and then the dosing is initiated. However, temperature sensors are sensitive to their physical location relative to the DEF and there is also hysteresis/lag of the temperature sensor. When a higher DEF mass flow rate is required, the size of the droplets may not be optimal and can result in deposit build-up and/or decreased operational efficiency.

Figure 3:
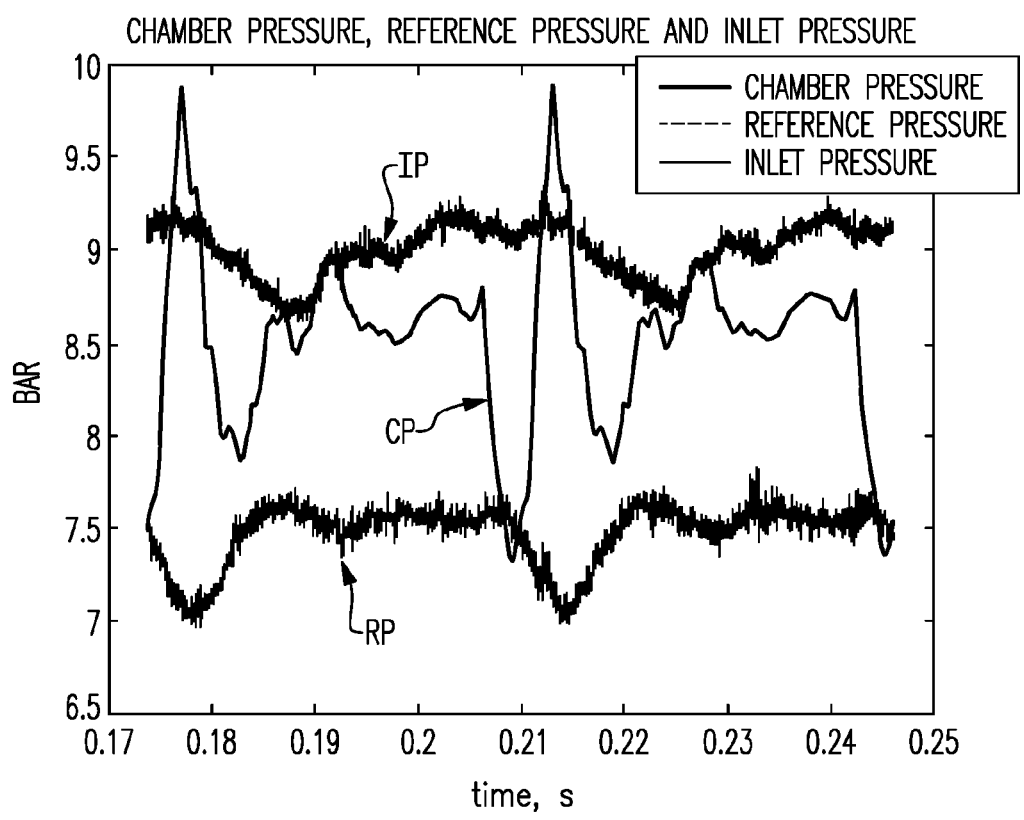
FIG. 3 is a graph showing chamber, reference, and inlet pressures vs. time.

One important characteristic for injection is a pressure as directly measured within the heated fluid chamber 54. FIG. 3 shows chamber pressure CP, reference pressure RP, and inlet pressure IP vs. time. While the reference pressure RP and inlet pressure IP are shown to be relatively constant over a specified time period, the chamber pressure CP inside the fluid chamber 54 fluctuates significantly over the same time period. If the pressure inside the fluid chamber 54 is below a certain pressure threshold, then it is not optimal to inject DEF because it increases the chance of undesirable ammonia by-products or deposits in the exhaust system and therefore does not provide the expected NOx efficiency.

The subject disclosure integrates the pressure sensor 66 into the heated fluid chamber 54 and provides a control system with a dosing algorithm that is based on pressure measurements. Pressure is more instantaneous and has less hysteresis than temperature. The pressure sensor 66 provides a feedback to the controller 38 on optimal dosing time depending on the heating chamber pressure range. This will produce the smallest DEF droplet sizes possible which will enhance the NOx efficiencies at the FTP LLC, and RDE operating conditions. Typical DEF droplet sizes have been approximately 20 µm; however, the subject disclosure provides for a significant improvement over prior designs as the droplet size is reduced to 15 µm or less.

A control algorithm determines the most appropriate injection timing based on a heating chamber pressure threshold. The control algorithm will determine optimal pressure inside the heating chamber 54 and based upon experimental test data will develop a look-up table to inject the two phase liquid/vapor DEF with the smallest droplets. In one example, the controller 38 determines the optimal timing based on pressure measurements and generates a dosing command when pressure measured within the fluid chamber 54 is within a range of 7-bars to 11-bars. The controller prevents fluid from being injected when pressure measured within the fluid chamber is below 7 bars. The DEF exiting the fluid outlet during this optimal timing as determined by the controller 38 is comprised of vapor and droplets having a size of no more than 15 µm. In one example, the controller 38 only uses the pressure data to determine the optimal timing. In other words, temperature measurements are not used to determine when to provide dosing.

The subject disclosure provides a pressure sensor that is integrated inside a heatable fluid chamber to provide pressure measurements that are used to determine the optimal timing for dosing heated vapor with small fluid droplets into an exhaust component. The pressure sensor provides feedback to the control system to determine an optimal dosing time depending on the chamber pressure range. This generates the best spray quality and smallest droplet size for exhaust temperature and flow, which will enhance the FTP LLC, and RDE NOx efficiencies.

Although an embodiment of this disclosure has been disclosed, a worker of ordinary skill in this art would recognize that certain modifications would come within the scope of this disclosure. For that reason, the following claims should be studied to determine the true scope and content of this disclosure.

The invention claimed is:

1. A vehicle exhaust system comprising:
a housing defining a fluid chamber, the housing having a fluid inlet configured to receive fluid from a fluid supply and a fluid outlet;
at least one pressure sensor positioned within the fluid chamber;
a heater to heat fluid supplied from the fluid supply such that heated fluid can be injected into a vehicle exhaust component via the fluid outlet;
a controller configured to receive pressure data from the at least one pressure sensor and to determine optimal timing for dosing of the vehicle exhaust component based on the pressure data, and wherein the controller determines the optimal timing and generates a dosing command when pressure measured within the fluid chamber is within a range that has a minimum pressure and a maximum pressure; and
wherein the maximum pressure is up to 11 bars and wherein the minimum pressure is no lower than 7 bars, and wherein dosing of the heated fluid occurs when the pressure measured within the fluid chamber is within the range, and wherein the controller prevents dosing when pressure measured within the fluid chamber is below the minimum pressure.

2. The vehicle exhaust system according to claim 1, wherein the housing includes at least one bore extending through a wall of the housing, and wherein the at least one pressure sensor is associated with the at least one bore to connect to the controller which is positioned external to the housing.

3. The vehicle exhaust system according to claim 2, including a sealed interface at the at least one bore to prevent fluid from exiting the housing via the at least one bore.

4. The vehicle exhaust system according to claim 1, wherein the controller only uses the pressure data to determine the optimal timing for dosing of the fluid.

5. The vehicle exhaust system according to claim 1, wherein the fluid comprises diesel exhaust fluid, and wherein fluid exiting the fluid outlet during the optimal timing as determined by the controller is comprised of vapor and droplets having a size range of a minimum size greater than zero to a maximum size of 15 μm.

6. The vehicle exhaust system according to claim 1, wherein the heater directly heats an internal or external surface of the housing.

7. The vehicle exhaust system according to claim 6, wherein the heater comprises a resistive heater, heat recovery, heat exchanger, or thermo chemical energy storage.

8. The vehicle exhaust system according to claim 1, wherein the controller compares measured pressure inside the fluid chamber to a look-up table based on experimental test data to determine the optimal timing for dosing the vehicle exhaust component via the fluid outlet.

9. The vehicle exhaust system according to claim 1, wherein the fluid chamber is free from any other sensors.

10. A vehicle exhaust system comprising:
a fluid supply of diesel exhaust fluid (DEF);
a vehicle exhaust component positioned upstream of an exhaust gas aftertreatment component, wherein the vehicle exhaust component defines an exhaust gas stream into which DEF is to be injected;
a housing defining a fluid chamber, the housing having a fluid inlet that receives DEF from the fluid supply and a fluid outlet in communication with the exhaust gas stream within the vehicle exhaust component;
at least one pressure sensor positioned within the fluid chamber;
a heater to heat DEF supplied from the fluid supply such that heated DEF can be dosed into the exhaust gas stream via the fluid outlet;
a controller configured to receive pressure data from the at least one pressure sensor and to determine optimal timing for dosing based on the pressure data, wherein the controller determines the optimal timing and generates a dosing command when pressure measured within the fluid chamber is within a range that has a minimum pressure and a maximum pressure; and
wherein the maximum pressure is up to 11 bars and wherein the minimum pressure is no lower than 7 bars, and wherein dosing of the heated fluid occurs when the pressure measured within the fluid chamber is within the range, and wherein the controller prevents dosing when pressure measured within the fluid chamber is below the minimum pressure.

11. The vehicle exhaust system according to claim 10, wherein the controller only uses the pressure data to determine the optimal timing for dosing of DEF.

12. The vehicle exhaust system according to claim 10, wherein DEF exiting the fluid outlet during the optimal timing as determined by the controller is comprised of vapor and droplets having a size range of a minimum size greater than zero to a maximum size of 15 μm.

13. The vehicle exhaust system according to claim 10, wherein the controller compares measured pressure inside the fluid chamber to a look-up table based on experimental test data to determine the optimal timing for dosing of fluid into the vehicle exhaust component via the fluid outlet.

14. The vehicle exhaust system according to claim 10, wherein the fluid chamber is free from any other sensors.

15. A method of controlling injection of fluid into a vehicle exhaust system component comprising:
providing a housing defining a fluid chamber, the housing having a fluid inlet configured to receive fluid from a fluid supply and a fluid outlet;
positioning at least one pressure sensor within the fluid chamber;
providing a heater to heat fluid supplied from the fluid supply such that heated fluid can be injected into a vehicle exhaust component via the fluid outlet; and
determining optimal timing for dosing the vehicle exhaust component based on pressure data generated by the at least one pressure sensor, and generating a dosing command when pressure measured within the fluid chamber is within a range that has a minimum pressure and a maximum pressure, wherein the maximum pressure is up to 11 bars and wherein the minimum pressure is no lower than 7 bars, and wherein dosing of the heated fluid occurs when the pressure measured within the fluid chamber is within the range, and wherein the controller prevents dosing when pressure measured within the fluid chamber is below the minimum pressure.

16. The method according to claim 15, wherein fluid exiting the fluid outlet during the optimal timing is comprised of vapor and droplets having a size range of a minimum size greater than zero to a maximum size of 15 μm.

17. The method according to claim 15, wherein a controller only uses the pressure data to determine the optimal timing for injection of the fluid, and wherein the fluid chamber is free from any other sensors.

* * * * *